United States Patent [19]

Andrews et al.

[11] 4,198,256
[45] Apr. 15, 1980

[54] METHOD OF MAKING A HEAT-SEALABLE ORIENTED POLYPROPYLENE FILM

[75] Inventors: William J. Andrews, Taunton; William J. M. Philpott, Bridgewater, both of England

[73] Assignee: British Cellophane Limited, England

[21] Appl. No.: 876,227

[22] Filed: Feb. 9, 1978

Related U.S. Application Data

[63] Continuation of Ser. No. 621,514, Oct. 10, 1975, abandoned, which is a continuation of Ser. No. 405,768, Oct. 12, 1973, abandoned.

[30] Foreign Application Priority Data

Oct. 17, 1972 [GB] United Kingdom ............ 47697/72

[51] Int. Cl.² ............................................. B32B 27/08
[52] U.S. Cl. .............................. 156/229; 156/244.18; 428/516; 428/520; 428/910; 264/291; 156/182; 264/241; 264/210.6; 264/210.7; 264/290.2
[58] Field of Search ................. 428/910, 520, 516; 156/229, 306; 264/171, 95, 210 R, 291

[56] References Cited

U.S. PATENT DOCUMENTS

| 3,508,944 | 4/1970 | Henderson et al. | 264/95 |
| 3,540,979 | 11/1970 | Hughes | 428/516 X |
| 3,671,383 | 6/1972 | Sakata et al. | 428/516 X |
| 4,117,193 | 9/1978 | Tsuchiya et al. | 428/516 X |
| 4,125,662 | 11/1978 | Weiner et al. | 428/516 X |

FOREIGN PATENT DOCUMENTS 1172643 12/1969 United Kingdom .

*Primary Examiner*—P. C. Ives
*Attorney, Agent, or Firm*—Watson, Cole, Grindle & Watson

[57] ABSTRACT

A heat-sealable oriented plastic film comprising an oriented polypropylene film having on at least one surface a heat-sealable layer comprising a predominantly linear random copolymer of ethylene and up to 12 mole percent of at least one further alpha-olefin having at least three carbon atoms per molecule.

8 Claims, No Drawings

METHOD OF MAKING A HEAT-SEALABLE ORIENTED POLYPROPYLENE FILM

This is a continuation, of application Ser. No. 621,514, filed Oct. 10, 1975, now abandoned which was a continuation application of parent application Ser. No. 405,768, filed Oct. 12, 1973, now abandoned.

This invention is concerned with heat-sealable polypropylene films.

Polypropylene film in recent years has been used to an increasing extent as a wrapping and packaging material due to its excellent clarity and due to its strength, such strength being considerably enhanced when the film is stretched in one or more directions under stretch-oriented conditions which at least partially oriented the molecular structure in the direction of stretch. By "stretch-orienting conditions" for polypropylene film is meant performing the stretching operation when the film is within a temperature range between 2° C. below the crystalline melting point of the polypropylene and its second order transition temperature.

For efficient wrapping purposes, particularly upon high speed wrapping machinery, it is necessary for the polypropylene film to be readily and easily heat-sealable to itself. Whereas polypropylene film is inherently heat-sealable to itself at the temperatures necessary to provide seals of adequate strength (that is about 160° C.), oriented film will shrink and produce undesirable buckling.

SUMMARY OF THE INVENTION

The present invention is concerned with providing oriented polypropylene film with a heat-sealable layer which will permit adequate heat-seals to be made at a temperature at which there is insignificant heat-distortion of oriented polypropylene film.

According to the present invention, a heatsealable oriented plastic film comprises an oriented polypropylene film having on at least one surface a heat-sealable layer comprising a predominantly linear random copolymer of ethylene and up to 12 mole percent of at least one further alpha-olefin having at least three carbon atoms per molecule.

The term 'polypropylene film' includes a film of polypropylene containing in admixture a small proportion of a compatible polyolefin which does not significantly affect the physical characteristics of the film.

The copolymer is formed by reacting the monomers under conditions which favor the formation of linear chains of ethylene units with little branching and random distribution of the comonomer along the chains, for example, low pressure catalytic conditions, such as are used in the polymerization of ethylene to form high density polyethylenes. Under these conditions, the reaction takes place at relatively low pressures in the presence of a coordination or organometallic catalyst such as a so-called Zeigler catalyst, or a transition metal oxide catalyst or similar catalyst.

When the copolymer has a content of the further alpha-olefin exceeding about 12 mole percent it tends to become tacky, resulting in the plastic film being difficult to handle in roll form and upon film-converting machinery.

The proportion of the further alpha-olefin in the random copolymer preferably lies in the range of between 2 and 8 mole percent of the copolymer, and more preferably between 2.5 and 5 mole percent, of the copolymer. The further alpha-olefin may, for example, be propylene or butene-1.

The copolymers of the present invention are characterized by having a melting point of below 135° C. as determined by Differential Thermal Analysis (D.T.A.), and those particularly useful in the performance of the invention have a D.T.A. melting point below 135° C. The D.T.A. melting point is determined by use of a differential scanning calorimeter marketed by Perkin-Elmer of Norwalk, Connecticut, United States of America in which the heating rate is 16 Centigrade degrees per minute.

The heat-sealable layer may be applied to the polypropylene film by any of the known methods. For example, a preformed film of the random copolymer may be laminated to the polypropylene film by a suitable adhesive or by stretching the preformed film or preferred films in intimate contact with the polypropylene film when the combination combines to form a unitary film. Also, the random copolymer may be melt-extruded onto one or both of the surfaces of a polypropylene film followed by cooling prior to the polypropylene film being stretched under stretch-orienting conditions.

Preferably, the heat-sealable plastic film is formed by co-extruding the polypropylene film with one or two layers of the random copolymer through a slot or annularly orificed die, followed by quenching and then stretching under stretch-oriented conditions.

Since the random copolymer is compatible with polypropylene, it is possible to return a small quantity of waste heat-sealable film to the extruder for the polypropylene film without significantly affecting the characteristics of the film.

The heat-sealable plastics film in accordance with the invention may be duplexed, that is, two films superimposed and joined, copolymer layer to copolymer layer, to form a laminate having useful properties.

The laminate may be formed by the application of heat and pressure or by stretching the two films when in surface contact with each other.

The invention also includes a method for the manufacture of a heat-sealable oriented plastic film comprising applying to at least one surface of a polypropylene film a layer of a predominantly linear random copolymer of ethylene and up to 12 mole percent of the copolymer of at least one further alpha-olefin having at least three carbon atoms per molecule, bringing the combination to a stretch-orienting condition and stretching in at least one direction.

The invention will now be more specifically described with reference to the following Examples:

EXAMPLE 1

A polypropylene melt was co-extruded through a slotted die at 300 feet per minute with outer layers of a melt of a substantially linear random copolymer marketed by Shell Chemicals (UK) Limited of London under the trademark Carlona 40-045/09 to produce a three layer molten laminate approximately 300 microns in thickness. The polypropylene constituted 90% of the thickness and each copolymer layer 5% of the thickness. The copolymer had a D.T.A. melting point of 114° C. and a density of 0.940. It consisted of ethylene copolymerized with about 2.5 mole percent of butene-1 under low pressure catalytic conditions.

The molten laminate, after extrusion, was immediately quenched in cold water and was then heated to 100°–115° C. and stretched by 20% in the machine direction between a series of rollers in which the rollers at the output end were rotated at a greater peripheral speed than the rollers at the input end.

The uniaxially stretched film was then fed to a stenter where it was heated to about 150° C. and stretched transversely to eight times its original width. The film, now biaxially oriented was cooled, trimmed at the edges and wound into a roll. The film had high clarity and was approximately 30 microns in thickness.

It was found that samples of the film would readily heat-seal to each other at 125° C. under a pressure of 14 pounds per square inch in one second to give a heat-seal strength of 600 grams per 38 millimeter width of film. On examination of the sealed strips, it was found that no distortion of the film had taken place during the sealing operation.

EXAMPLE 2

The procedure as set out in Example 1 was repeated except that the "Carlona" copolymer was replaced by a predominantly linear random copolymer of ethylene and propylene in which the propylene content amounted to 4 mole percent. The copolymer had been made under low pressure catalytic conditions and had a density of 0.930 and a D.T.A. melting point of 115° C.

The waste trimmed from the edges of the film after biaxial orientation but before winding into a roll was chopped up, ground and fed back to the extruder for the polypropylene melt.

The biaxially oriented film was approximately 30 microns in thickness. It readily heat-sealed to itself at 118° C. under a pressure of 14 pounds per square inch for one second to give a heat-seal strength of 700 grams per 38 millimeters of film. No distortion of the film took place during the sealing operation.

EXAMPLE 3

A predominantly linear random copolymer of ethylene and butene-1 in which the butene-1 content amounted to 3 mole percent was cast into a sheet 3 thousandths of an inch thick. The copolymer had been produced under low pressure catalytic conditions and had a density of 0.930 and D.T.A. melting point of 117° C.

The cast copolymer sheet was then laminated to a cast sheet of polypropylene 40 thousandths of an inch thick by heating the assembly to 140° C. and applying a pressure of 250 pounds per square inch.

The resultant laminate was then heated to a temperature of 160° C., and was stretched simultaneously 700% in two directions perpendicular to each other to produce a biaxially oriented laminate.

The laminate readily heat-sealed to itself, copolymer side to copolymer side, at 120° C. under a pressure of 14 pounds per square inch for one second to give a heat-seal strength of 1000 grams per 38 mm. width of film.

No distortion in the film was observed as a result of the heat-sealing operation.

We claim:

1. A method of manufacturing an oriented film product comprising a layer consisting essentially of polypropylene and a layer of a heat-sealable copolymer layer on at least one surface thereof, which comprises the steps of
    (1) co-extruding through a die at least two melts, one of said melts comprising a mixture of polypropylene and waste film from step (6), and a second of said at least two melts comprising a linear random copolymer of ethylene and up to 12 mole percent of at least one alpha olefin selected from the group consisting of propylene and butene-1; said co-extruded melts forming a multilayer film;
    (2) quenching said multilayer film;
    (3) heating said quenched multilayer film to a sufficient temperature for stretch orientation;
    (4) stretching said multilayer film in at least one direction to orient the polypropylene component in said multilayer film;
    (5) trimming said stretched multilayer film around its edges to produce both a waste film and the oriented film product; and
    (6) mixing said waste film with polypropylene to form said mixture of polypropylene and waste film used in step (1).

2. The method in accordance with claim 1 wherein in step (1) three melts are co-extruded through said die to form a three-layered multilayer film comprising an inner layer formed of polypropylene and waste film and outer layers formed of said linear random copolymer of ethylene and up to 12 mole percent of said alpha olefin.

3. A method according to claim 1 in which said alpha-olefin content of said copolymer lies in the range of between 2 and 8 mole percent of said copolymer.

4. A method in accordance with claim 1 wherein said heating of the quenched multilayer film in step 3 is to a temperature of about 110°–115° C.

5. A method in accordance with claim 1 wherein said quenching of multilayer film in step (2) is accomplished by immersing the film in cold water.

6. A method in accordance with claim 1 wherein said stretching of said multilayer film in step (4) is accomplished by passing said film between a series of rollers in which the rollers at the output end are rotated at a greater peripheral speed than the rollers at the input end.

7. A method in accordance with claim 6 wherein subsequent to passing between said series of rollers, the uniaxially stretched film is stretched in its transverse direction to eight times its original width.

8. A method in accordance with claim 6 wherein said linear random copolymer consists of ethylene and 4 mole percent of propylene, said copolymer having a density of 0.930 and a D.T.A. melting point of 115° C.

* * * * *